Jan. 14, 1969 — Q. R. GLEASON ET AL — 3,421,600
INDUSTRIAL LUBRICATING SYSTEM
Filed March 14, 1966

INVENTORS
QUIN R. GLEASON &
GEORGE E. THRASHER, JR.
BY
Barnes, Kisselle, Raisch & Choate
ATTORNEYS

INVENTORS
QUIN R. GLEASON &
GEORGE E. THRASHER, JR.
BY
Barnes, Kisselle, Raisch & Choate
ATTORNEYS

INVENTORS
QUIN R. GLEASON &
GEORGE E. THRASHER, JR.
BY
Barnes, Kisselle, Raisch & Choate
ATTORNEYS

United States Patent Office 3,421,600
Patented Jan. 14, 1969

3,421,600
INDUSTRIAL LUBRICATING SYSTEM
Quin R. Gleason, Warren, and George E. Thrasher, Jr.,
Pontiac, Mich., assignors to Master Pneumatic-Detroit,
Inc., Utica, Mich., a corporation of Michigan
Filed Mar. 14, 1966, Ser. No. 533,986
U.S. Cl. 184—7                    20 Claims
Int. Cl. F01m 1/02; F16n 7/14; F16n 25/00

ABSTRACT OF THE DISCLOSURE

A number of individual air-actuated lubricant pumps are mounted beneath a lubricant reservoir. Individual pumps or individual groups of pumps are selectively actuated at different frequencies by a mechanism which counts the cycles of operation of the lubricated equipment. The counting mechanism converts air pressure fluctuations to intermittent unidirectional rotary movement of cams to actuate pneumatic valving associated with the pumps.

---

This invention relates generally to a lubricating system for lubricating various kinds of machinery and equipment used in industrial plants. The invention is particularly adapted for use in the lubrication of equipment such as pneumatic cylinders, valves, and the like which operate in a closed, pressurized system. However, it is also useful for lubricating machinery bearings, ways, gearing, and the like which operate in the ambient atmosphere.

One type of industrial lubricator in general use utilizes a flow of air in a pneumatic system to cause oil to be transferred from a reservoir into a conduit. The flow of air in the conduit propels the oil to the pneumatic cylinder, valve or the like which is to be lubricated. This type of lubricator is known in the art as an air-line lubricator, an example of which is disclosed in Gleason et al. 3,131,786. While this type of lubricator has the advantage of relative simplicity and low cost, it has limitations, one of which is that it will not function satisfactorily under extremely low rates of flow in a conduit which, for example, may be connected with a cylinder and piston utilized as an air cushion which supports a self-leveling loading platform or the like.

Moreover, in industrial plants, it is customary to operate many pieces of pneumatic equipment of varying types from a common source of air under pressure; and these pieces of equipment may vary in rate of operation from hundreds of cycles per minute to just a few cycles per day. With conventional lubricating equipment, it has not been possible to furnish such widely varying types of equipment each with proper quantities of lubricant. Another factor which complicates lubrication problems is that even though the various pieces of equipment to be lubricated may be similar, the pneumatic circuitry to each varies widely, some air lines being relatively short while others are relatively long and tortuous. Under these conditions, the equipment served by the shorter lines receive a surplus of oil while those served by the longer or more tortuous lines do not receive enough.

A further factor which contributes to improper lubrication utilizing conventional air line lubricators is that an operator cannot actually see the condition of the lubricated parts, and the human tendency is to utilize a lubricator of too great a capacity in any one installation to guard against a feared inadequacy of lubrication. The result is an unnecessary flooding of the equipment with lubricant.

The general object of the present invention is to provide a lubrication system which is relatively simple and inexpensive and which is so improved that it can deliver with accuracy the proper amount of lubricant to each of a relatively large number of pieces of equipment of varying types and cyclic rates over long periods of operation reliably, with little or no probability of failure.

In general, the invention contemplates the use of an injection-type pump which is actuated to deliver lubricant to a piece of equipment each time that the equipment has gone through a predetermined number of cycles of operation. The invention includes an actuating device having means responding to force fluctuations representing a predetermined number of cycles of operation of the lubricated equipment. The device utilizes these fluctuations to cause relative cycling of actuating means for the pump. The volumetric capacity of the pump itself determines the quantity of lubricant delivered to the equipment upon each actuation, and metering orifices are eliminated. More detailed features of the invention include the structure of the pump-actuating device, a reservoir and pump assembly, and means operably interrelating the two. These features are described and discussed more in detail below.

Figure 13:
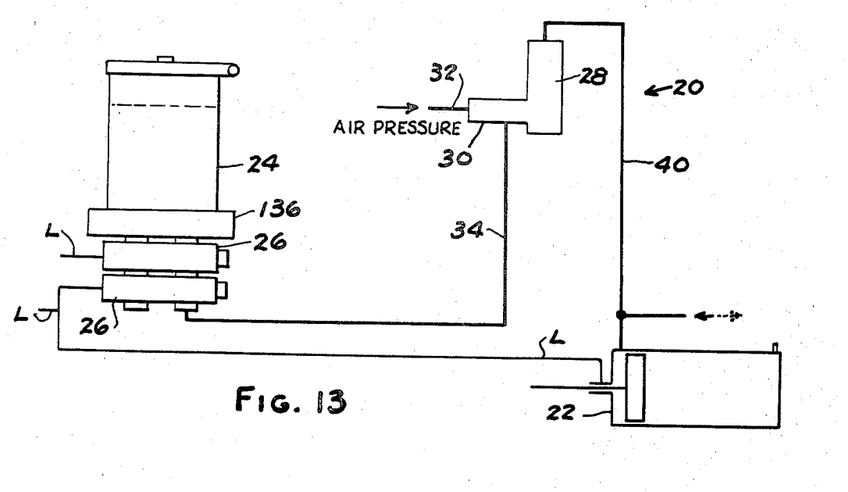
FIG. 13 is a diagrammatic view of a lubricating system according to this invention.

Shown in FIG. 13 is a typical lubricating system 20 according to the present invention arranged to deliver lubricant to a number of pieces of equipment such as a pneumatic cylinder 22, the system including a lubricant reservoir 24 with a number of lubricant pumps 26 assembled thereto. Each pump, upon actuation, delivers lubricant from the reservoir to a line L by which the lubricant is conducted to the particular piece of equipment to be lubricated. The pumps are actuated periodically by actuating means which includes a counting mechanism 28 which periodically operates a valve 30 to admit compressed air from a line 32 to a line 34 connected to the pumps. Each time a pump 26 is actuated by the compressed air, it delivers a relatively small, predetermined quantity of lubricant to the equipment to be lubricated.

Figures 1, 2:
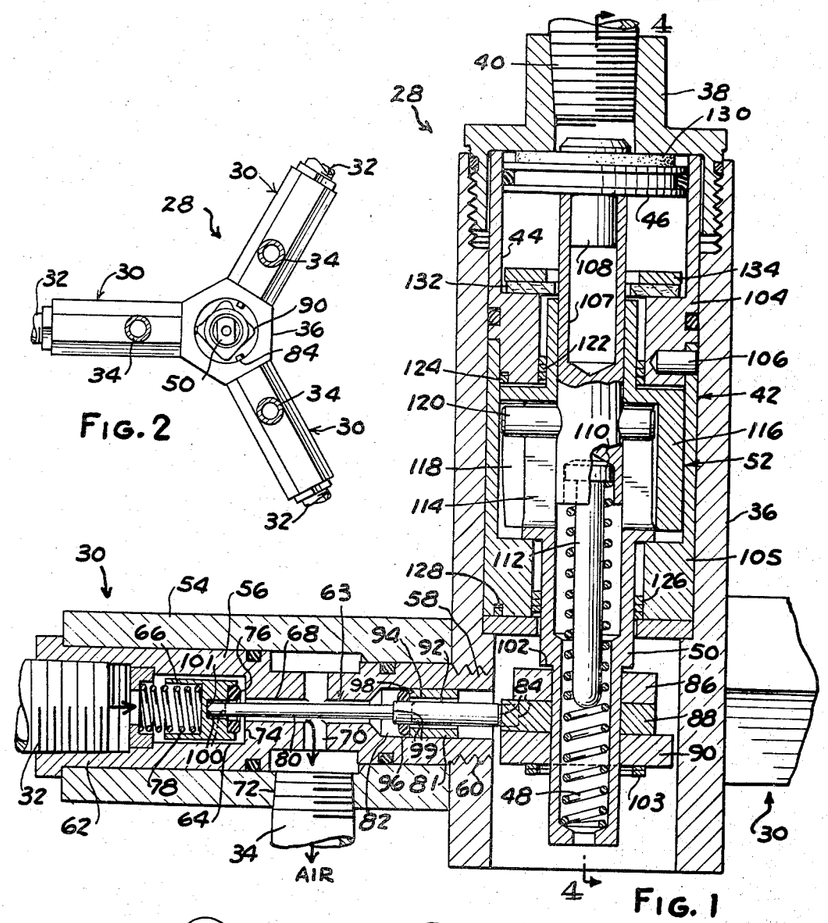
FIG. 1 is a fragmentary, generally vertical sectional view through a pump actuator according to this invention.
FIG. 2 is a smaller scale, generally bottom plan view of the actuator shown in FIG. 1.
Figure 3:
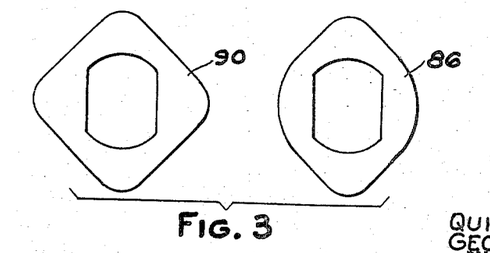
FIG. 3 is a composite plan view illustrating different cams which can be used in the pump actuator of FIG. 1.
Figure 4:
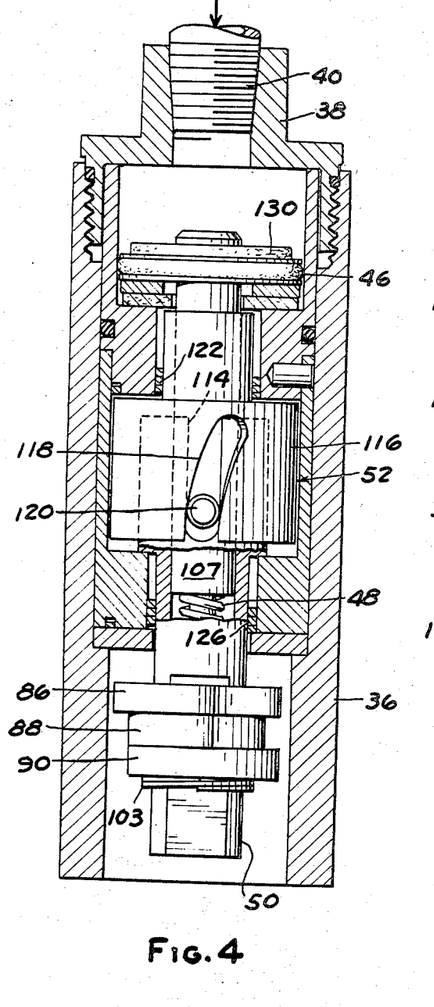
FIG. 4 is a sectional view on line 4—4 of FIG. 1.
Figure 5:
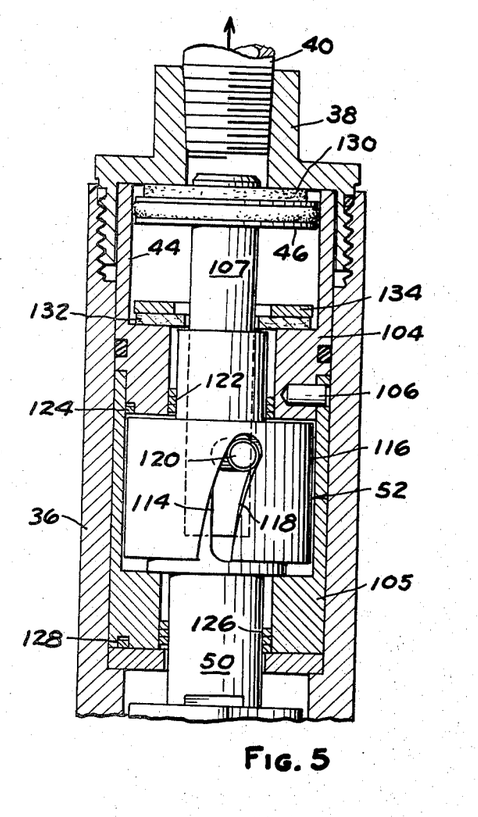
FIG. 5 is a fragmentary, sectional view similar to FIG. 4 but showing certain parts in different relation.

Counter 28 has a body 36 (FIGS. 1, 4, 5) with a fitting 38 threaded for connection to an air line 40 communicating into one end of cylinder 22. Within body 36 is an assembly 42 defining cylinder 44 containing a piston 46 exposed to pressure fluctuations in air line 40. Piston 46 is forced downwardly as FIGS. 1, 4, and 5 are viewed when pressure is introduced into cylinder 44, and when the pressure is relieved, piston 46 is returned upwardly by a spring 48 contained in assembly 42. Adjacent the lower end of the assembly is a shaft 50 and between this shaft and the piston is a converter mechanism 52 which converts reciprocation of piston 46 into intermittent unidirectional rotation by shaft 50. The converter mechanism is described in detail below.

Radiating from counter body 36 are a plurality of valves 30 (FIG. 2). Each valve has a body 54 with a liner 56 therein. The liner has one end portion 58 threaded into an opening 60 in counter body 36 (FIG. 1), the other end 62 of the liner being threaded for connection to air line 32. Between its ends, the liner defines a passageway 63 having one portion 64 which contains a valve member 66, the passageway continuing in a smaller portion 68 which communicates through an outlet 70 to an opening 72 in valve body 54 threaded for connection to air line 34. Between passageway portions 64 and 68 is a shoulder 74 forming a seat for a seal 76 on valve member 66, which is biased toward closed condition by a spring 78.

A valve stem 80 extends from valve member 66 through passageway portion 68 and through a guide bushing 81 press-fitted into an enlarged continuation 82 of the passageway. An end 84 of the valve stem projects out of passageway portion 82 into engagement with one of three cams 86, 88, 90 on counter shaft 50. Between guide bushing 81 and valve stem portion 92 disposed therein is a clearance 94 providing a vent port for passageway 63. An O-ring seal 96 is disposed around the valve stem within passageway portion 82 and adjacent the inner end 98 of guide bushing 81. The inner end 99 of valve stem enlargement 92 penetrates and withdraws from within O-ring 96 to close and open vent port 92 upon operating movements of valve member 66, as will be brought out in greater detail below. The valve stem has an end 100 which abuts and disengages the bottom 101 of a recess in the valve member upon opening and closing of the valve.

Cams 86–90 are secured axially in position on shaft 50 by means of a shoulder 102 on the shaft and a snap ring 103 thereon beneath the cams. The cams and shaft have cooperating flats as shown which secure them against relative rotation. Openings 60 in counter body 36 are disposed at different vertical positions so that the valve stems of the three valves 30 are each held in vertical alignment with a different one of the three cams.

Assembly 42 comprises a casing having two elements 104 and 105 pinned together as at 106. Casing element 104 defines cylinder 44. A piston rod 107 is rotatably joined to piston 46 by means of a stud 108 on the piston which projects into the piston rod. The lower end of the piston rod (FIG. 1) has a recess which receives the head 110 of a guide pin 112 for spring 48. Shaft 50 is coaxial with piston rod 107 and has an upper bifurcate portion which defines a slot 114 extending parallel to the direction of reciprocation of the piston rod. Rotatably surrounding the piston rod is a sleeve 116 having a slot 118 therein which is angled to the direction of slot 114. A laterally extending pin 120 on piston rod 107 is engaged within slots 114 and 118.

A helical brake spring 122 is interposed between a portion of sleeve 116 and casing element 104. An end 124 of the brake spring is anchored within a recess in the casing element. A helical brake spring 126 is interposed between a portion of shaft 50 and lower casing element 105, and this spring has an end portion 128 anchored within a recess in the lower casing element. Springs 122 and 126 are wound in the same direction and in the structure illustrated, they prevent rotation of shaft 50 and sleeve 116 counterclockwise (looking downwardly as FIG. 1 is viewed) and free the shaft and sleeve for clockwise rotation only.

Disposed within the ends of cylinder 44 are shock-absorbing washers 130 and 132 and one or more spacing washers 134 may be placed in cylinder 44 for controlling the length of stroke of piston 46 and piston rod 107.

Reservoir 24 (FIG. 9) comprises a base 136 having an upwardly disposed recess 138 provided with a shoulder 140 which supports an open bottom lubricant container 142 and a filter 144 which filters lubricant en route to pumps 26. The filter is secured in place by a bolt 146 passing therethrough and threaded into a boss 148 in base 136, and a nut 150 threaded into clamping engagement against the upper central portion of the filter.

Figures 9, 10:
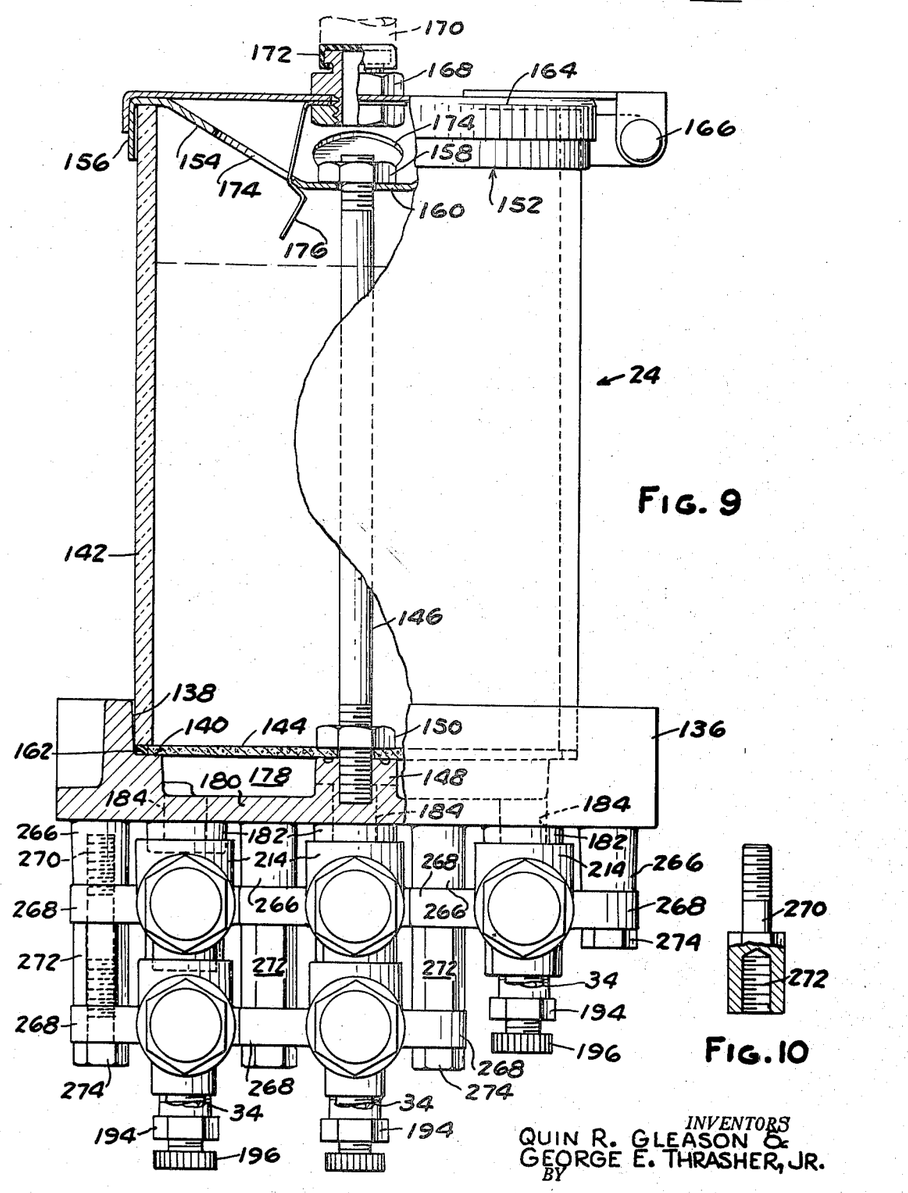
FIG. 9 is a view partly in elevation and partly in section of the reservoir and pump assembly.
FIG. 10 is a view partly in elevation and partly in section of a bolt by which the assembled pumps and reservoir of FIG. 9 are secured together.

The reservoir is provided with a lid 152 having an inner member 154 with a peripheral flange 156 hooked over the top of container 142. The inner lid member is clamped downwardly against the container by means of a nut 158 threaded onto the upper end of bolt 146 into snug engagement with central web portion 160 of the inner lid member. This secures container 142 snugly against the top of filter 144 and on top of an O-ring seal 162 on shoulder 140 disposed in a circumferential space between the filter periphery and recess wall 138.

An upper cap 164 is hinged to inner lid member 154 at 166. To fill the reservoir, cap 164 may be raised and lubricant poured in, or the cap may be left down and lubricant introduced into the reservoir through an apertured fitting 168 from a hose 170 having a cooperating fitting 172 thereon. Inner lid member 154 is provided with openings 174 through which the lubricant passes into container 142. A leaf spring latch 176 yieldably secures cap 164 in closed condition.

Beneath filter 144 is a chamber 178 for filtered lubricant. Projecting downwardly from the bottom wall 180 of the reservoir base are three bosses 182 and an outlet opening 184 extends from chamber 178 through bottom wall 180 and each boss 182.

Each pump 26 has a tubular body 186 (FIGS. 7 and 11) with two oppositely disposed bosses 188 and 190 having openings therein which communicate to the body interior. Each boss 188 is dimensioned and configured to be coupled selectively with either a boss 182 on the reservoir bottom or a boss 190 on another pump body. Adjacent each boss 188 is an O-ring seal 192. Bosses 182 and 190 are internally threaded for reception of a closure plug 194 which may be provided with a drain cock 196.

Figures 7, 7A, 8:
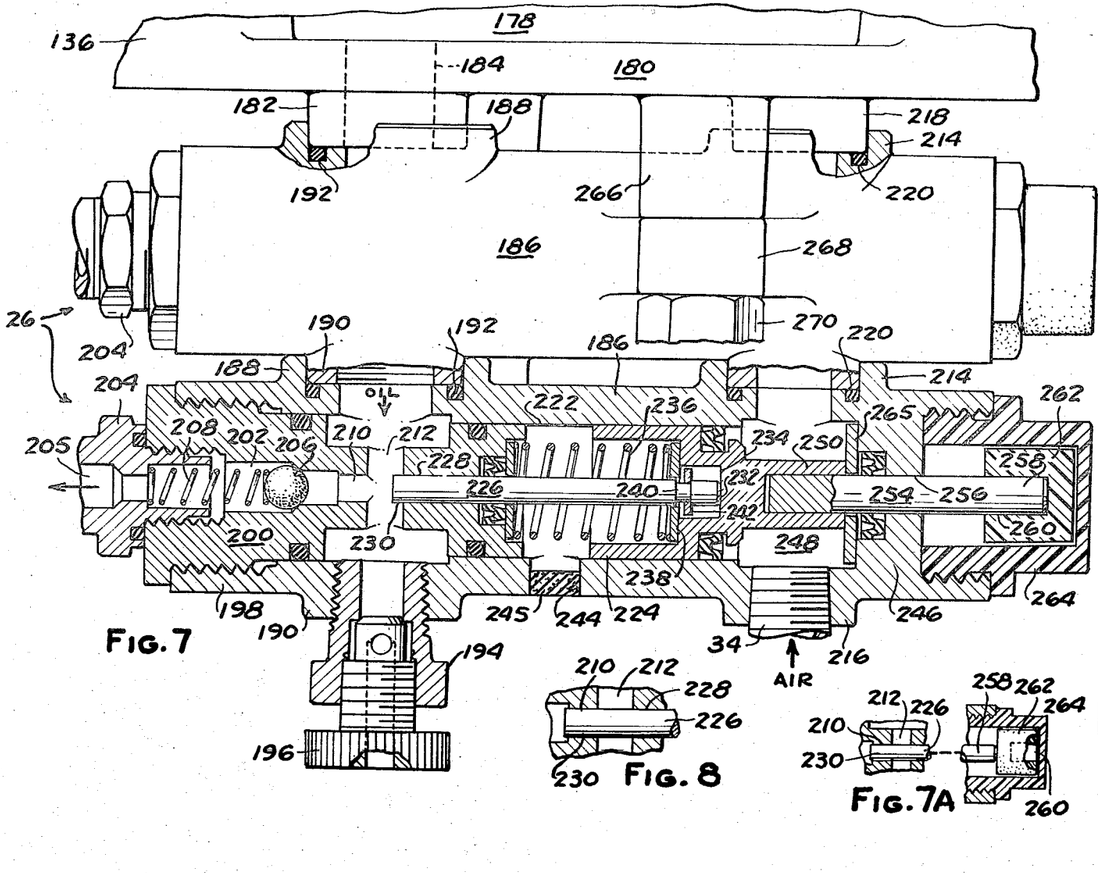
FIG. 7 is a fragmentary view partly in section and partly in elevation of a reservoir and pump assembly according to this invention.
FIG. 7A is a fragmentary partly diagrammatic sectional view similar to FIG. 7 but on a smaller scale and showing certain parts in a different relation.
FIG. 8 is a fragmentary sectional view showing a position of a pump plunger different from that of FIG. 7.

Threaded into one end portion 198 of each pump body is a plug 200 having a central opening 202 closed at its outer end by a threaded fitting 204 defining an outlet 205 which is adapted for connection to a lubricant line L. Opening 202 contains a ball-type check valve 206 urged toward closed condition by a spring 208. Opening 202 continues in a portion defining a port 210 which opens into a transverse passageway 212 aligned with the openings in bosses 188 and 190.

Each pump body 186 has a second aligned pair of bosses 214 and 216 with openings which communicate to the body interior. Each boss 214 is dimensioned and configured to be coupled selectively with a boss 216 on another pump body or with one of three positioning bosses 218 which project downwardly from bottom wall 180 of the reservoir. Adjacent the opening in each boss 214 is an O-ring seal 220. Each boss 116 is internally threaded for connection to an air line 34.

The interior of each pump body 186 defines a cylinder 222 within which a piston 224 reciprocates. A plunger 226 reciprocates within a guide opening 228 in plug 200 which is aligned with port 210 so that upon reciprocation of the plunger an end portion 230 thereof enters and withdraws from the port.

Plunger 226 has an end portion 232 engaged by cylinder head 234 which forces the plunger to the left as FIG. 7 is viewed upon leftward movement of the piston. The piston is returned to the right by a spring 236 compressed against plug 200 and reacting against a washer 238 seated on the piston. Plunger 226 extends through a central opening in washer 238 and has a reduced portion 240 carrying a ring 242 engageable by washer 238 to return the plunger with piston 224. The pump body has a breather opening 244 for cylinder 222 and this opening contains a filter 245.

Each pump body has a closed end portion 246 which defines a chamber 248 for receiving compressed air. Piston 224 has a recessed extension 250 within which is press-fitted a push rod 254 which extends slidably through an opening 256 in body end 246. The outer end portion 258 of the push rod has a friction fit within an opening 260 in a push button 262. A transparent plastic cover 264 is threadedly connected to the pump body adjacent end 246. A washer 265 limits movement of piston 224 to the right by engagement therewith of extension 250.

Figure 11:
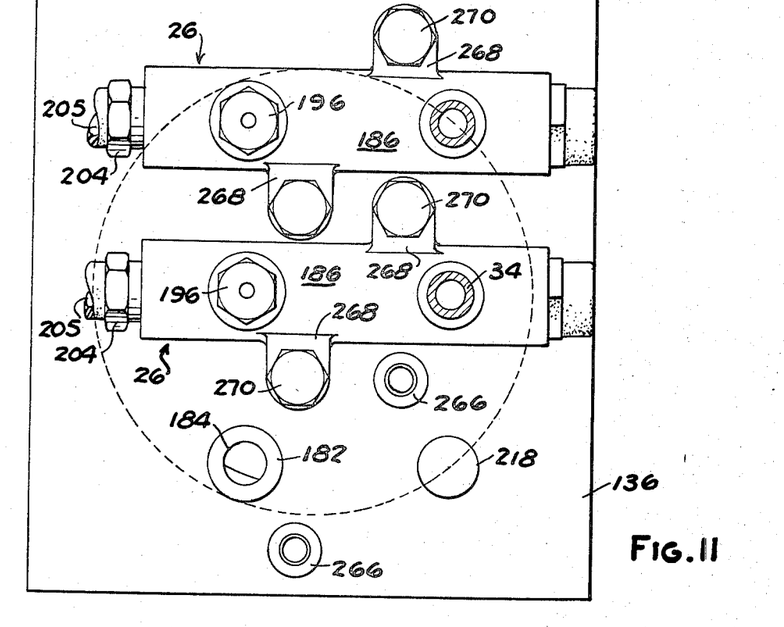
FIG. 11 is in general a bottom plan view of the assembly shown in FIG. 10.
Figure 12:
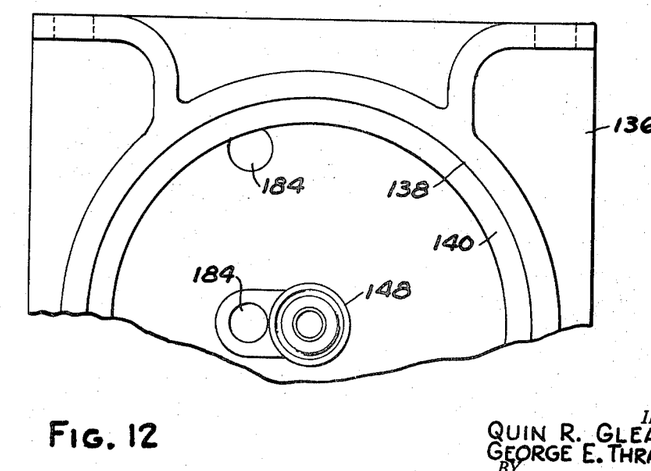
FIG. 12 is a fragmentary, top plan view of the oil reservoir base separate from the other parts.

Projecting downwardly from bottom wall 180 of reservoir base 136 are three pairs of mounting bosses 266 which are hollow and internally threaded. Each pump body is provided with oppositely projecting mounting lugs 268 positioned to align with bosses 266 when body bosses 188 and 214 are engaged respectively with reservoir bosses 182 and 218.

The mounting lugs of the pump or pumps immediately beneath bottom wall 180 of the reservoir are secured to mounting bosses 266 by bolts 270. Each of these bolts has an elongate, hollow, internally threaded head 272 which, in turn, provides a mounting boss by which a second pump 26 can be mounted immediately below the pump secured directly to the reservoir base. By the use of bolts 270, stacks of pumps can be suspended beneath the reservoir base, and the number of pumps in each stack may be varied as desired. The bottom pump in each stack is secured to the bolt heads immediately above by ordinary bolts 274.

In use, it may be assumed that stacks of one or more pumps 26 have been mounted beneath reservoir base 136 in alignment with each of the lubricant outlets 184 in the base. In the stacked pumps, there are aligned hollow bosses 182 and 190 and plug passageways 212 which cooperate to form an extended lubricant passageway beneath each outlet 184 so that each pump is furnished with lubricant from the reservoir by gravity. The bottom of this passageway is closed by plug 194.

Similarly, the aligned bosses 214 and 216 of the pumps and their chambers 248 form an extended air duct through which air under pressure is furnished from air line 34 for actuating all pistons 224 in the stack. The top of this extended duct is closed by the O-ring 220 in sealed relation between pump boss 214 and reservoir boss 218.

It may be assumed that air line 32 has been connected to a source of compressed air and that air line 40 has been connected between cylinder 22 and counter 28. An air line 34 has been connected between each valve 30 and a pump or pump stack assembled to reservoir 24. The lubricant line from each pump has been connected between the outlet port 205 of each pump and the equipment such as cylinder 22 which is to be lubricated thereby.

Each time air under pressure is introduced into the left end of cylinder 22 (as FIG. 13 is viewed), this pressure is transmitted through air line 40 into cylinder 44 of the counting mechanism and against the upper face of piston 46. Piston 46 is forced downwardly. Pin 120 tends to rotate sleeve 116 counterclockwise because of the angular disposition of slot 118. However, rotation of the sleeve in a counterclockwise direction is prevented by brake spring 122. Therefore, as piston rod 107 moves downwardly with piston 46, pin 120 is forced to rotate clockwise. This rotation is transmitted to slotted portion 114 of shaft 50, thereby rotating cams 86, 88, 90. During this portion of the cycle, the parts move from the FIG. 5 position to the FIG. 4 position.

When the pressure is relieved in the left end of cylinder 22, spring 48 returns piston rod 107 and piston 46 from the FIG. 4 position to the upward FIG. 5 position. During this movement, sleeve slot 118 by engagement with pin 120 tends to rotate shafts 50 and 107 counterclockwise. However, brake spring 126 prevents counterclockwise rotation of shaft 50 so that pin 120 urges sleeve 116 clockwise. Brake spring 122 releases to permit clockwise rotation of the sleeve.

During subsequent fluctuations of pressure in the left end of cylinder 22, piston 46 reciprocates with the result that cams 86, 88, and 90 are intermittently turned through relatively small angles in a clockwise direction. The lobing on each cam is so correlated with its angular movement that the lobing actuates valve stem 80 each time cylinder 22 has gone through a predetermined number of operating cycles.

In the closed position of valve member 66, valve stem 80 is in the position shown in dotted lines in FIG. 1. End 84 thereof is engaged against a low portion of its respective cam, shoulder 99 is retracted from O-ring 96 and end 100 of the valve stem is spaced from bottom 101 in the valve member. As a cam lobe gradually comes into registry with end 84 of the valve stem, it slowly advances the valve stem to the left as FIG. 1 is viewed. After shoulder 99 on the valve stem engages O-ring 96, end 100 of the valve stem engages bottom 101 on the valve member and gradually moves it to the open position illustrated.

Compressed air from air line 32 is admitted into passageway 63 and O-ring 96 is forced against end 98 of bushing 81, thereby sealing vent port 94. The air under pressure passes from valve 30 through air line 34 and pressurizes chambers 248 in pumps 26.

When the pressure in chambers 248 exerts sufficient force on pistons 224, they move to the left as FIG. 7 is viewed, overcoming the force of springs 236. Plunger end 230 is thereby moved across passageway 212 and penetrates port 210 (FIG. 8). Assuming that passageway 202 to the left of the port is filled with lubricant, this movement of the plunger causes lubricant to unseat ball 206 and a predetermined quantity of the lubricant is forced past the ball into passageway 202 and through outlet 205. The amount of lubricant forced out of the outlet depends upon the diameter of plunger end 230 and the effective length of its stroke within port 210. Thus, each time the plunger advances into the port, an accurately measured amount of lubricant is forced through the lubricant line L connected therewith and delivered to cylinder 22 or other equipment with which the pump is associated.

When the lobe on cam 88 rotates out of registry with end 84 of valve stem 80, spring 78 forces valve member 66 and the valve stem to the right, as FIG. 1 is viewed, thereby seating seal 76 against shoulder 74 and cutting off the air pressure communication between air lines 32 and 34. Thereafter, the valve stem continues movement to the right until shoulder 99 thereon disengages O-ring 96 as shown in dotted lines in FIG. 1. This opens vent port 94 and the air under pressure in pump cylinders 222 and chambers 248 escapes through air line 34, passageway 63, and the vent port.

Springs 32 force pistons 224 to the right as FIG. 7 is viewed, thereby retracting plunger end 230 from the FIG. 8 position out of port 210 to the FIG. 7 position. Thereafter, plungers 226 remain in the inactive position of FIG. 7 until lobing on cam 88 is again rotated into registry with end 84 of valve stem 80, whereupon the lubricant injection process is repeated. Similarly, cams 86 and 90 cyclically operate the valve stems 80 and valve members 66 in the valves 30 with which they are associated and the air line 34 connected to each of the valves can be connected to a different stack of pumps on reservoir base 136.

The cams may have different numbers of lobes. For example, cam 88 may have a single lobe (FIG. 6) and cams 86 and 90 may be provided with two and four lobes respectively. Thus, valves 30 and their respective associated pump stacks may be cycled different numbers of times upon a single rotation of shaft 50, and a single counter 28 can therefore be used to deliver different quantities of lubricant as required to different pieces of equipment. Moreover, the frequency of operation of any of the valves can be changed as desired merely by changing the cam by which it is actuated. This can be done by removing snap ring 103, removing one or more of cams 86, 88, 90 and replacing them with others, and reinstalling the snap ring.

Figure 6:
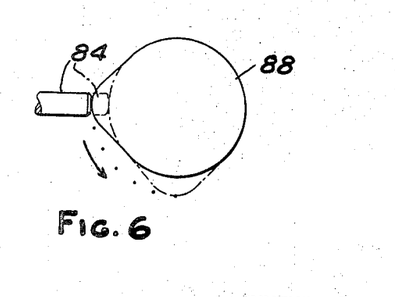
FIG. 6 is a diagrammatic bottom plan view illustrating the relation between a cam in the pump actuator and a valve stem.

The rate of rotation of shaft 50 depends upon the angle between slots 114 and 118 and also upon the effective length of stroke of piston 46 and piston rod 107. The slot angles can be varied by utilizing different shafts 50 and sleeves 116. The length of stroke can be effectively changed in any counter 28 merely by adding or subtracting spacers 134 in cylinder 44. Utilization of one or more such spacers having predetermined thicknesses makes possible accurate control of the rate of rotation of shaft 50 even though the components of converter mechanism 52 and other parts of the counter are made merely to ordinary manufacturing tolerances. In a typical apparatus according to this invention, shaft 50 can be made to rotate once for each 50 reciprocations of piston 46. However, for convenience of illustration, shaft 50 is shown as being rotated once for each 24 reciprocations of piston 46 as represented in FIG. 6 wherein the single cam lobe rotates through each quadrant upon six reciprocations of the piston.

When lubricating system 20 is first installed, it may be desirable to prime the system or parts of it by repeated operation of some or all pumps 26. All of the pumps may be so operated by inserting a tool through the open bottom of counter body 36 and engaging the flats on shaft 50. The shaft may then be rotated to cycle valves 30 rapidly and thereby actuate the pumps until the system is fully primed. Alternatively, any individual pump can be cycled rapidly for priming purposes by removing cap 264 from the pump body and repeatedly pushing and releasing push button 262, following which cap 264 is replaced.

Cap 264 serves several purposes. First, it assists in excluding dirt from entry into the pump interior between push rod 254 and its guide opening 256. Second, being transparent, it facilitates visual observation of the movement of push button 262, thereby giving an indication of whether or not particular pumps are functioning properly. Third, if it should be desired to lock a particular pump out of operation, cap 264 is removed, push button 262 is pulled off of rod end 258 and reversed end for end and inserted in cap 264. The cap is then replaced on the pump body.

End portion 258 of the push rod instead of penetrating opening 260 engages the closed end of the push button. The cap and push button cooperate to force the push rod, piston 224, and plunger 226 to the left from the FIG. 7 position to the FIG. 7A position wherein end 230 of the plunger is secured within port 210. Thereafter, the pump components remain uninfluenced by fluctuations of pressure in chamber 248. Push button 262 may be provided with indicia such as different colors at its opposite ends so that it can be determined at a glance whether a particular pump is active or locked out of operation.

If, during the course of operation of the system, it becomes desirable to change the cyclic rate of a pump and thereby vary the rate at which it delivers lubricant to a piece of equipment, the pump can be transferred from a stack operated by one cam such as cam 88 to a stack operated by another cam such as cam 90. This is done by removing the necessary bolts 272, 274, transferring the pump involved, and then reassembling the pump stacks and their bolting.

As has been brought out above, the lubricant delivery rates of the pumps can be varied by the use of spacers 134 in cylinder 44, varying the relative angles of slots 114, 118, and varying the lobe arrangements on cams 86, 88, 90. In addition, the delivery rate can be varied from pump to pump by varying the diameter of plunger end 230 and port 210 and the effective penetration of the plunger into the port.

The pumps of one stack may be actuated by one counter 28 while the pumps in another stack are actuated by a different counter. Thus, in a single system according to this invention, a large number of pieces of equipment of different varieties can be lubricated at different rates according to their requirements. Some pumps assembled to one reservoir could be used to lubricate pressurized equipment such as air cylinders and valves while other pumps assembled to the reservoir are used to lubricate equipment operating at atmospheric pressures such as machine gear boxes, ways, and the like. Lubricant line L from any pump can be connected into an air line furnishing compressed air to pneumatically operated equipment so that the pump serves generally as an "air line" lubricator.

One important advantage of the invention is that it utilizes no high pressure metering orifice which might become partially or totally obstructed by dirt or other foreign matter in the lubricant. Nevertheless, with each actuation of each pump, a precisely determined quantity of lubricant is delivered. In a typical arrangement according to this invention, shaft 50 and the cam thereon rotate once for each 50 reciprocations of piston 46 and piston rod 107. The effective length of stroke of plunger 226 and the dimensions of plunger end 230 and port 210 are coordinated so that upon each actuation of the pump $\frac{1}{40}$ cc. of lubricant is delivered through outlet 205. In such an arrangement, plunger end 230 has a diameter of about $\frac{1}{8}''$, and its effective stroke is about $\frac{1}{8}''$. With this arrangement, assuming the use of a single lobe cam 88, the pump delivers lubricant at the rate of .0005 cc. for each cycle of operation of piston 46.

Figure 14:
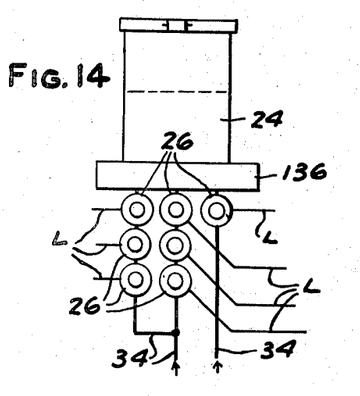
FIG. 14 is a fragmentary, diagrammatic view of a system according to this invention with components arranged differently than in FIG. 13.
Figure 15:
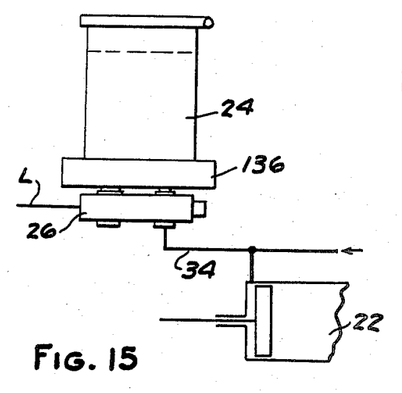
FIG. 15 is a diagrammatic illustration of another lubricating system utilizing the present invention.

The system shown in FIG. 14 is in general similar to that shown in FIG. 13 except that the stacking arrangement of pumps 26 is different to illustrate the flexibility of the system. The system shown in FIG. 15 further illustrates flexibility of the system in that where actuation of pump 26 is desired for each cycle of operation of equipment such as cylinder 22, counter 28 need not be used. Instead air line 34 is connected directly between the pump and cylinder so that the pump is actuated directly by pressure fluctuations in the cylinder.

Figure 16:
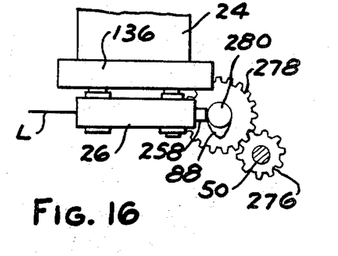
FIG. 16 is a fragmentary, diagrammatic illustration of another lubricating system according to the present invention.

FIG. 16 discloses further modifications of the system. For example, when very slow cycling of a pump is desired, reduction gearing 276, 278 may be interposed between shaft 50 and a shaft 280 upon which a cam such as cam 88 is mounted. Also, if only one pump 26 is to be actuated, the cam can be mounted for direct actuating engagement with push rod end 258.

Figure 17:
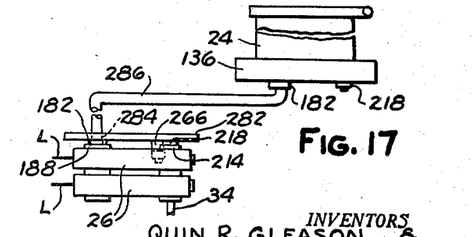
FIG. 17 is a fragmentary, diagrammatic illustration of another lubricating system utilizing the present invention.

Shown in FIG. 17 is a further modification of the system wherein the stack of pumps 26, instead of being mounted on reservoir base 136, is mounted on a bracket 282 remote from the reservoir. The bracket is shaped similarly to the bottom wall 180 of reservoir base 136, in that it is provided with bosses 182 and 218 and mounting bosses 266 to which upper pump 26 in the stack are secured in the manner described above. Bracket 282 is provided with an opening 284 which communicates with apertured boss 182 to facilitate introduction of lubricant from the reservoir into the pumps by means of a lubricant line 286 extending from reservoir boss 182 and connected into opening 284. With this arrangement, a single reservoir can be utilized to furnish lubricant to several remote pump stacks where such factors as space or convenience require.

In the counter 28 illustrated, piston rod 107 is reciprocated by the use of a piston 46 responding to air pressure fluctuations. However, it will be obvious from a consideration of the drawings that other types of force fluctution could be used to actuate rod 107. For example, fitting 38 could be removed from the end of counter body 36 and rod 107 could be reciprocated by any suitable mechanical means.

We claim:
1. A lubricating system which comprises,
  a reservoir for lubricant in fluent condition,
  pump means having an inlet communicating with said reservoir and an outlet, said pump means being operable upon actuation to deliver a substantially predetermined quantity of lubricant from said reservoir through said outlet,
  a device having a passageway adapted to be connected to a source of fluid under pressure,
  valving operable to control the flow of fluid in said passageway,
  said device including operating means adapted to receive and respond to fluctuating force from an external source;
  said operating means including a first element which is mounted for lineal movement in one direction responsive to receipt of said force and which is returnable in the other direction upon relief of said force,
  a rotary mounted second element,
  converter means operable to convert lineal movement of said first element into intermittent unidirectional rotation by said second element,
  and means associated with said second element effective to operate said valving responsive to rotation of said second element through a predetermined angle;
  and pump-actuating means operably interposed between said device and pump means,
  said pump-actuating means being operable under the influence of variations in the condition of the fluid in said passageway incident to operation of said valving to actuate said pump means.

2. The system defined in claim 1 wherein said means associated with said second element comprises cam means.

3. The system defined in claim 1 wherein said converter means comprises a rod element mounted for rotation and for lineal movement with said first element,
  a rotatable third element relative to which said rod element moves lineally,
  said second and third elements having means engaged with means on said rod element,
  said engaged means being operable to urge said second and third elements toward relative rotation in opposite directions upon lineal movement of said rod element.
  and means effective to constrain said second and third elements to rotation in the same direction.

4. The system defined in claim 3 wherein said engaged means comprises projecting means on one of said elements engaged in recessing in the other elements.

5. The system defined in claim 4 wherein the recessing in one element is substantially parallel to the direction of movement of said rod element and the recessing in said other element is angled thereto.

6. The system defined in claim 4 wherein said rod element and second and third elements are substantially coaxial and have longitudinally overlapping portions, said projecting means being disposed on said portion of said rod element and said recessing being disposed in said portions of said second and third elements.

7. A lubricating system which comprises,
  a reservoir for lubricant in fluent condition,
  pump means having an inlet communicating with said reservoir and an outlet, said pump means being operable upon actuation to deliver a substantially predetermined quantity of lubricant from said reservoir through said outlet,
  a device having a passageway adapted to be connected to a source of fluid under pressure,
  valving operable to control the flow of fluid in said passageway,
  said device including operating means adapted to receive and respond to fluctuating force from an external source;
  said operating means including a cylinder adapted to be connected with a source of fluid under pressure,
  a piston in said cylinder reciprocable responsive to pressure fluctuations in said cylinder, a piston rod associated with said piston and mounted for rotation relative to said cylinder,
  a rotatable shaft provided with slotting, a rotatable sleeve provided with slotting, a projection on said piston rod engaged within said slotting,
  said slotting being configured so that said sleeve and shaft are urged toward relative rotation in opposite directions upon lineal movement of said piston rod,
  a brake associated with said shaft, and a brake associated with said sleeve,
  said brakes being effective to constrain said shaft and sleeve to rotation in the same direction, whereby to convert lineal reciprocation of said piston rod to intermittent unidirectional rotation by said shaft,
  and cam means on said shaft effective to operate said valving;
  and pump-actuating means operably interposed between said device and pump means,
  said pump-actuating means being operable under the influence of variations in the condition of the fluid in said passageway incident to operation of said valving to actuate said pump means.

8. The system defined in claim 7 wherein said piston rod, shaft, and sleeve are substantially coaxial, said brakes comprising helical brake springs engaged with said shaft and sleeve respectively.

9. A lubricating system which comprises,
  a reservoir for lubricant in fluent condition,
  pump means having an inlet communicating with said reservoir and an outlet, said pump means being operable upon actuation to deliver a substantially predetermined quantity of lubricant from said reservoir through said outlet,
  a device having a passageway adapted to be connected to a source of fluid under pressure,
  a valve movable in said passageway to open and closed positions to control the flow of fluid in said passageway,
  said device including operating means adapted to receive and respond to fluctuating force from an external source,
  said operating means being effective to operate said valving responsive to a substantially predetermined number of force fluctuations received thereby;
  said operating means including a valve stem movable in said passageway and operatively connected with said valve member,
  means providing a vent port for said passageway, a seal in said passageway,
  said valve stem having portions which engage and disengage said seal respectively upon movement of said stem toward open and closed positions of said valve, said seal being effective to close and open said vent port respectively when engaged and disengaged by said stem portions;
  and pump-actuating means operably interposed between said device and pump means,
  said pump-actuating means being operable under the influence of variations in the condition of the fluid in said passageway incident to operation of said valving to actuate said pump means.

10. The system defined in claim 9 and including a guide bushing in said passageway through which said valve stem slidably projects, said vent port comprising a space between said stem and bushing, said seal comprising an O-ring disposed in said passageway adjacent an end portion of said bushing, said portion of said valve stem comprising an enlargement thereon which axially engages and disengages said O-ring.

11. A lubricating system which comprises, a reservoir for lubricant in fluent condition, a plurality of pumps, each having an inlet communicating with said reservoir and an outlet, each of said pumps being operable upon actuation to deliver a substantially predetermined quantity of lubricant from said reservoir through said outlet, a device having a plurality of passageways each adapted to be connected to a source of fluid under pressure, a valve operable to control the flow of fluid in each of said passageways, said device including operating means adapted to receive and respond to fluctuating force from an external source, said operating means being provided with a plurality of valve operating elements, one for the valve for each of said passageways, said elements, responsive to a common number of said force fluctuations, being effective to operate said valves cyclically at different frequencies, pump-actuating means operably interposed between said passageways and pumps, said pump-actuating means being operable under the influence of variations in the condition of the fluid in said passageways incident to operation of said valves to actuate the respective pumps.

12. A lubricant reservoir and pump assembly comprising, a lubricant reservoir having an outlet, a plurality of pumps, each of which has a body defining a lubricant passageway and a compressed air duct, said body defining a cylinder between said duct and passageway, a piston in said cylinder exposed to pressure in said duct and a rod on said piston reciprocable within said passageway to form a pump plunger, means effective to assemble selected ones of said pumps together with their passageways and ducts aligned to form respectively an extended passageway and an extended duct, means effective to mount the assembled pumps in a generally vertical stack beneath said reservoir outlet so that said extended passageway receives lubricant gravitationally therefrom, closures effective to close the lowermost end of said extended passageway and to close said extended duct except for an opening adapted for connection to a source of air under pressure, each of said pump bodies having an opening which forms an outlet from said passageway to the exterior of said assembly.

said pistons and plungers being operative substantially simultaneously to eject lubricant from said passageway through the respective outlet openings responsive to introduction of air under pressure into said extended duct.

13. The assembly defined in claim 12 wherein each of said pumps includes an element mounted for movement with said plunger and extending to the exterior of said body to provide a visual indicator of operation of said plunger.

14. The assembly defined in claim 13 wherein said indicator is disposed for manual access, said plunger being operable responsive to manual force applied to said indicator.

15. The assembly defined in claim 13 wherein said element has one position in actuated condition of said plunger and another position in deactuated condition of said plunger, and means on said body selectively operable to secure said element in one of said positions to restrain operation of said plunger in response to said air under pressure and to release said element to facilitate such operation of said plunger.

16. The assembly defined in claim 15 wherein said selectively operable means includes a removable cap on said body, and spacer means selectively positionable between said cap and element to so restrain and release said element.

17. The assembly defined in claim 12 wherein said reservoir has a bottom wall containing said reservoir outlet, the uppermost pump body being mounted on said bottom wall with said passageway therein aligned with said outlet.

18. The assembly defined in claim 12 wherein the mounting for said assembled pumps is remote from said reservoir, said reservoir outlet including conduit for lubricant extending from said reservoir to said mounting.

19. The assembly defined in claim 12 wherein said reservoir has a plurality of outlets to each of which is mounted a stack of said pumps.

20. A lubricating system which comprises, a reservoir for lubricant in fluent condition, pump means having an inlet communicating with said reservoir and an outlet, said pump means being operable upon actuation to deliver a substantially predetermined quantity of lubricant from said reservoir through said outlet, pump-actuating mechanism having a body on which a rod is mounted for reciprocation and rotation, a rotatable shaft on said body provided with slotting, a rotatable sleeve on said body provided with slotting, a projection on said rod engaged within said slotting, said slotting being configured so that said sleeve and shaft are urged toward relative rotation in opposite directions upon lineal movement of said rod, a brake associated with said shaft and a brake associated with said sleeve, said brakes being effective to constrain said shaft and sleeve to rotation in the same direction, whereby to convert lineal reciprocation of said rod to intermittent unidirectional rotation by said shaft, cam means on said shaft, and means providing an operative connection between said cam means and pump means by which said pump means is actuated responsive to rotation of said cam means.

References Cited

UNITED STATES PATENTS

| 1,787,741 | 1/1931 | Zerk | 184—7 |
|---|---|---|---|
| 2,022,620 | 11/1935 | Harper | 184—27 X |
| 2,792,911 | 5/1957 | Harter | 184—7 |
| 2,837,174 | 6/1958 | Lyden | 184—81 |
| 3,264,949 | 8/1966 | Dietlin | 92—31 |
| 3,298,460 | 1/1967 | Porter et al. | 184—7 |
| 3,317,002 | 5/1967 | McKenzie | 184—7 |
| 3,317,003 | 5/1967 | Lukas | 184—81 |

HOUSTON S. BELL, JR., *Primary Examiner.*

U.S. Cl. X.R.

184—27, 81; 92—31; 103—150; 74—88